United States Patent
Paradies et al.

(10) Patent No.: US 10,831,771 B2
(45) Date of Patent: Nov. 10, 2020

(54) INTERACTIVE EXPLORATION OF LARGE GRAPHS

(71) Applicant: SAP SE, Walldorf (DE)

(72) Inventors: Marcus Paradies, Walldorf (DE); Michael Rudolf, Heidelberg (DE); Wolfgang Lehner, Dresden (DE)

(73) Assignee: SAP SE, Walldorf (DE)

( * ) Notice: Subject to any disclaimer, the term of this patent is extended or adjusted under 35 U.S.C. 154(b) by 471 days.

(21) Appl. No.: 14/792,217

(22) Filed: Jul. 6, 2015

(65) Prior Publication Data

US 2017/0011099 A1    Jan. 12, 2017

(51) Int. Cl.
*G06F 16/00* (2019.01)
*G06F 16/248* (2019.01)

(52) U.S. Cl.
CPC .................. *G06F 16/248* (2019.01)

(58) Field of Classification Search
CPC ......... G06F 17/30554; G06F 16/30553; G06F 16/248
See application file for complete search history.

(56) References Cited

U.S. PATENT DOCUMENTS

| | | | |
|---|---|---|---|
| 8,533,182 B1 * | 9/2013 | Charboneau | G06F 16/90335 707/718 |
| 8,996,492 B2 | 3/2015 | Paradies et al. | |
| 9,031,976 B2 | 5/2015 | Seufert et al. | |
| 9,535,963 B1 * | 1/2017 | Shankar | G06F 16/9024 |
| 9,547,728 B2 | 1/2017 | Bornhoevd et al. | |
| 9,697,254 B2 | 7/2017 | Paradies et al. | |
| 9,934,324 B2 | 4/2018 | Paradies et al. | |
| 2004/0260691 A1 * | 12/2004 | Desai | G06F 16/83 |
| 2007/0112737 A1 * | 5/2007 | Carlson | G06F 16/24553 |
| 2010/0185649 A1 * | 7/2010 | Zhou | G06F 16/9024 707/769 |
| 2010/0250611 A1 * | 9/2010 | Krishnamurthy | G06F 16/904 707/797 |
| 2011/0010352 A1 * | 1/2011 | Jockisch | G06F 16/951 707/706 |
| 2012/0078951 A1 * | 3/2012 | Hsu | G06F 16/24532 707/769 |
| 2012/0203752 A1 * | 8/2012 | Ha-Thuc | G06F 16/35 707/706 |

(Continued)

OTHER PUBLICATIONS

Abello, J. et al., "ASK-GraphView: A Large Scale Graph Visualization System," IEEE Transactions on Visualization and Computer Graphics, vol. 12, No. 5, pp. 669-676, 2006.

(Continued)

*Primary Examiner* — Usmaan Saeed
*Assistant Examiner* — David M Nafziger
(74) *Attorney, Agent, or Firm* — Sterne, Kessler, Goldstein & Fox P.L.L.C.

(57) ABSTRACT

Disclosed herein are system, method, and computer program product embodiments for interactive exploration of graph data. An embodiment operates by compiling a data query in any database-readable language based upon an input parameter. A data query of a graph data set is then conducted but is halted when a breakpoint generated from the input parameter is reached. Halting the data query includes partitioning a data subset from the graph data set. The data subsets is then displayed.

20 Claims, 7 Drawing Sheets

(56) References Cited

U.S. PATENT DOCUMENTS

| | | | |
|---|---|---|---|
| 2012/0229466 A1* | 9/2012 | Riche | G06F 16/9038 345/440 |
| 2012/0330961 A1* | 12/2012 | Miao | G06F 16/285 707/740 |
| 2014/0092045 A1* | 4/2014 | Ananthapadmanabh | G06F 3/041 345/173 |
| 2014/0101178 A1* | 4/2014 | Ginter | G06F 16/90335 707/755 |
| 2014/0244687 A1* | 8/2014 | Shmueli | G06F 16/28 707/780 |
| 2014/0280047 A1* | 9/2014 | Shukla | G06F 16/2228 707/722 |
| 2014/0304251 A1* | 10/2014 | Bornea | G06F 16/24542 707/718 |
| 2015/0120775 A1* | 4/2015 | Shao | G06F 16/2456 707/769 |
| 2015/0161201 A1* | 6/2015 | Sadikov | G06F 16/24542 707/722 |
| 2015/0186478 A1* | 7/2015 | Yan | G06F 16/24578 707/722 |
| 2015/0370838 A1* | 12/2015 | Paradies | G06F 16/9024 707/738 |
| 2016/0048607 A1* | 2/2016 | Raman | G06F 16/90335 707/798 |
| 2016/0063081 A1* | 3/2016 | Rudolf | G06F 16/254 707/602 |
| 2016/0092584 A1* | 3/2016 | Nigam | G06F 16/2272 707/741 |
| 2016/0179883 A1* | 6/2016 | Chen | G06F 16/24544 707/714 |
| 2016/0179887 A1* | 6/2016 | Lisonbee | G06F 16/9024 707/718 |
| 2016/0328467 A1* | 11/2016 | Zou | G06F 16/36 |
| 2016/0371355 A1* | 12/2016 | Massari | G06F 16/25 |
| 2016/0378831 A1* | 12/2016 | Infante-Lopez | G06F 16/9024 707/769 |
| 2017/0060958 A1* | 3/2017 | Van Rest | G06F 16/9024 |

OTHER PUBLICATIONS

Akoglu, L. et al., "OPAvion: Mining and visualization in large graphs," Proceedings of SIGMOD, ACM, pp. 717-720, 2012.

Bhowmick, S.S. et al., "VOGUE: Towards a Visual Interaction-aware Graph Query Processing Framework," Proceedings of CIDR, 10 pages, 2013.

Chau, D.H. et al., "Apolo: Interactive Large Graph Sensemaking by Combining Machine Learning and Visualization," Proceedings of SIGKDD, ACM, pp. 739-742, 2011.

Hung, H.H. et al., "QUBLE: Towards blending interactive visual subgraph search queries on large networks," The VLDB Journal, 27 pages, Jun. 2014.

Nandi, A., "Querying Without Keyboards," Proceedings of CIDR, 4 pages, 2013.

Paradies, M. et al., "Graphite: An Extensible Graph Traversal Framework for Relational Database Management Systems," available at https://arxiv.org/abs/1412.6477, 12 pages, Dec. 19, 2014.

Rudolf, M. et al., "The Graph Story of the SAP HANA Database," Proceedings of BTW, vol. 214 of LNI, pp. 403-420, 2013.

Vasilyeva, E. et al., "GraphMCS: Discover the Unknown in Large Data Graphs," Proceedings of EDBT/ICDT Workshops,. 200-207, Mar. 28, 2014.

Wang, H. and Aggarwal, C.C., "A Survey of Algorithms for Keyword Search on Graph Data," Managing and Mining Graph Data, vol. 40 of Advances in Database Systems, pp. 249-273, Springer US, 2010.

Yang, S. et al., "Schemaless and Structureless Graph Querying," Proceedings of the VLDB Endowment, vol. 7, No. 7, pp. 565-576, Sep. 1-5, 2014.

* cited by examiner

INTERACTIVE EXPLORATION OF LARGE GRAPHS

BACKGROUND

Traditional data exploration follows a direct, ad-hoc interaction with a database by using a declarative query language, such as SQL, through a console-oriented interface. The current generation of data interfaces are often built upon a query-to-result paradigm, in which an application extracts all the necessary information to construct a query, sends the query request to a database engine, and presents the result. During the execution of the query, however, no interaction with the database engine is possible.

Traditional data exploration requires a knowledge of declarative query languages, such as SQL, in order to receive desired data from a database engine. In addition, traditional data exploration often presents entire data sets from a database engine, which can place a strain on a system's memory.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, method and/or computer program product embodiments, and/or combinations and sub-combinations thereof, for visualizing and interactively exploring a graph.

Figure 1:
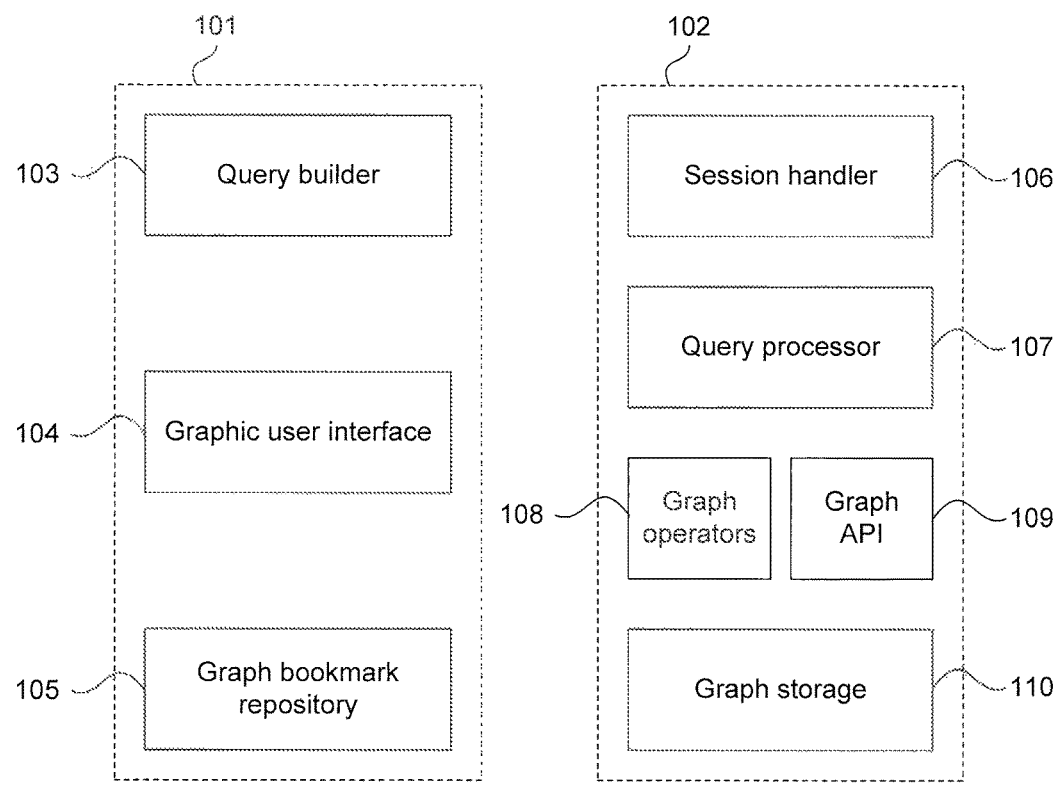
FIG. 1 is a block diagram of a graph visualization and exploration tool integrated with a graph database, according to an example embodiment.

FIG. 1 is a block diagram 100 of a graph visualization and exploration system 101 integrated with a graph database 102, according to one embodiment.

In an embodiment, graph visualization and exploration system 101 comprises a query builder 103, a graphical user interface (GUI), and a graph bookmark repository 105. Graph visualization and exploration system 101 may be a browser based system that queries a graph database for a graph data set that may be displayed and explored in the browser based system.

In an embodiment, graph data base 102 comprises a session handler 106, query processor 107, graph operators 108, graph API 109, and graph storage 110. Graph data base 102 may be a memory-centric data management system that leverages hardware capabilities, such as vast main memory space, multi core CPUs and GPU processors, and storage device division (SDD) storage.

In an embodiment, the graph visualization and exploration system 101 includes a query builder 103. Query builder 103 compiles data queries based upon an input parameter received by GUI 104. The data queries are compiled in any database-readable language such as structured query language (SQL), SQL Script (a scripting language for describing application specific calculations inside the database), MultiDimensional eXpressions (MDX), and proprietary languages, such as GEM (for data graph processing) and FOX (for planning applications), to give a few examples.

In an embodiment, query builder module 103 generates a plurality of break points according to the input parameter.

According to an embodiment, query builder 103 may compile a neighborhood query based upon a second input parameter. The neighborhood query compiled is in any database-readable language.

In an embodiment, the graph visualization and exploration system 101 includes a GUI 104. GUI 104 may receive an input parameter as interactions with buttons displayed in GUI 104, text typed into boxes displayed in GUI 104, or interactions with information displayed in GUI 104. These interactions may be, for example, mouse clicks, mouse drags, or gestures made on a touch screen—to name a few.

In an embodiment, GUI 104 displays materialized data received from the session handler 106. In addition, while GUI 104 is displaying materialized data, GUI 104 may receive a second input parameter. The second input parameter may be received as interactions with buttons displayed in GUI 104, text typed into boxes displayed in GUI 104, or interactions with information displayed in the GUI 104. These interactions may be, for example, mouse clicks, mouse drags, or gestures made on a touch screen to name a few.

According to an embodiment, the graph visualization and exploration system 101 includes a graph bookmark repository 105. Graph bookmark repository 105 stores materialized data displayed in GUI 104 when prompted. Graph bookmark repository 105 may be a Random-Access Memory (RAM), a Flash Memory, a Hard Drive, or a Solid State Drive—to name a few.

In an embodiment, graph database 102 comprises a graph storage 110. Graph storage 110 may store graph data sets as sets of vertices and sets of edges in a column based format in a memory cache of a computer device.

According to an embodiment, graph data base 102 includes a session handler 106. Session handler 106 creates and manages sessions and connections to the graph visualization and exploration system 101. Session handler 106 may start or halt a session between the graph visualization and exploration system 101 and graph database 102 according to the data query and plurality of break points.

In an embodiment, session handler 106 may continue a session between the graph visualization and exploration system 101 and graph database 102 according to the second input parameter.

In an embodiment, the graph database 102 includes a query processor 107, graph operators 108, and graph API 109. Query processor 107, graph operators 108, and graph API 109 are managed by session handler 106. Query processor 107, graph operators 108, and graph API 109 may traverse a graph data set stored in graph storage 110 based upon a session started or continued by session handler 106.

In an embodiment, session handler 106 will materialize a graph data subset or neighborhood data set according to the graph data that the query processor 107, graph operators 108, and graph API 109 traverse.

Figure 2:
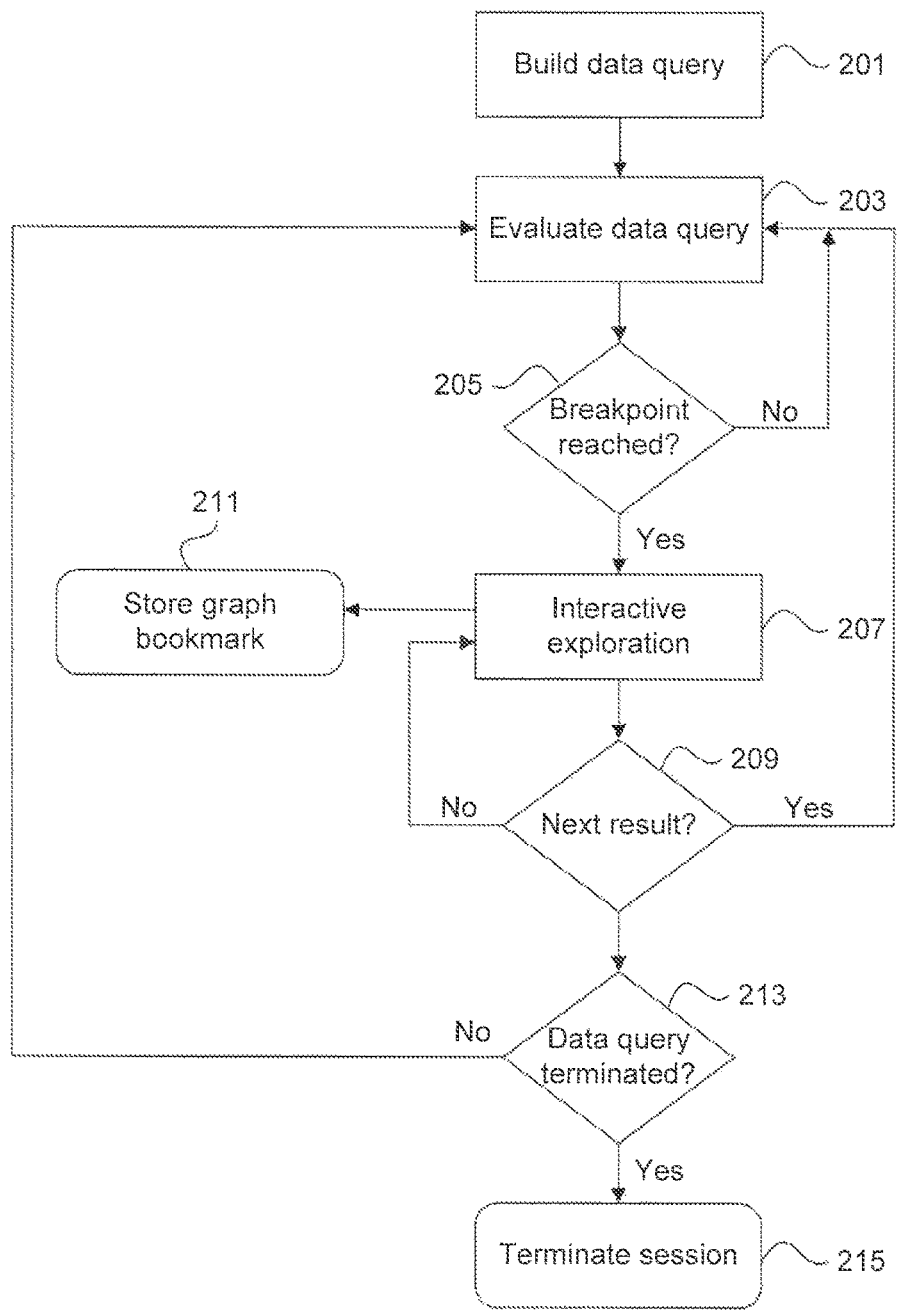
FIG. 2 is a flowchart illustrating a process for interactive graph exploration, according to an example embodiment.

FIG. 2 is a flowchart for a method 200 for interactive graph exploration, according to an embodiment. Method 200 can be performed by processing logic that can comprise hardware (e.g., circuitry, dedicated logic, programmable logic, microcode, etc.), software (e.g., instructions run on a processing device), or a combination thereof.

Prior to the exploration, GUI 104 receives a first input parameter. For example, GUI 104 may receive an input parameter that may comprise a graph data set pointer, a query type, a plurality of parameters, and at least one operator.

According to an embodiment, at step 201, a driver query based upon the first input parameter is compiled in any database-readable language by query builder 103. Query builder 103 may then compile a data query comprising a request for a traversal of a desired graph data set according to the input parameter.

In an embodiment, at step 201, a plurality of break points are generated by query builder 103. The value of the break points may be based upon the parameters and operators of the first input parameter. The data query and break points are then sent to the session handler 106.

In an embodiment, at step 203, the driver query is evaluated by the system. Based upon the driver query received by the query processor 103, the session handler 106 may initiate a session. During this session, query processor 107, graph operators 108, and graph API 109 may traverse a graph data set stored in the graph storage 110 according to the data query.

At step 205, the session handler 106 will determine whether or not a value in the graph data set matching the condition of a break point has been traversed while query processor 107, graph operators 108, and graph API 109 are traversing the graph data set, according to an embodiment. If no value matching the condition of a breakpoint has been reached, then query processor 107, graph operators 108, and graph API 109 will repeat step 203 and continue to traverse the graph data set according to the driver query. However, if a value matching the condition of a break point has been traversed, then the traversal will be halted by session handler 106.

Once the traversal is halted, the section of the graph data set that was traversed before the traversal was halted will be compiled into a first graph data subset, materialized, and sent to GUI 104, GUI 104 may then display the materialized first graph data set.

In an embodiment, at step 207, a second input parameter is received by GUI 104. The second input parameter may comprise one of a next result request, a neighborhood data request, a graph bookmark request, or a query termination.

If the second input parameter comprises a neighborhood data request, it is sent to query builder 103 and query builder 103 may compile a neighborhood query based upon the neighborhood data request in any database-readable language.

According to an embodiment, query builder 103 may then send the neighborhood query to session handler 106. Query processor 107, graph operators 108, and graph API 109 may then traverse the graph data set according to the neighborhood query. When the system has finished traversing the graph data set according to the neighborhood query, the graph data from the graph data set that was traversed will be compiled into a neighborhood data set. The neighborhood data set is materialized and sent to GUI 104. GUI 104 may then display the materialized neighborhood data set.

In an embodiment, step 211 occurs when the second input parameter comprises a graph bookmark request. A graph bookmark is created based upon the materialized graph data subset or neighborhood data set displayed by GUI 104. The graph bookmark is then stored in the graph bookmark repository 105 in any computer-readable storage method.

At Step 209, the system determines whether the second input parameter comprises a next result request, in an embodiment. If it does not comprise a next result request, then step 207 is repeated. However, if it does comprise a next result request, the next result request may be sent to session handler 106. Session handler 106 will then continue the traversal that was halted in step 205, and query processor 107, graph operators 108, and graph API 109 will continue to traverse the graph data set until a value matching the condition of a break point has been reached, in which step 207 is repeated.

According to an embodiment, step 213 determines whether the second input parameter comprises a query termination request. If it does comprise a query termination request GUI 104 will send the query termination request to session handler 106.

Step 215 occurs when session handler 106 has received a query termination request. One the query termination request has been received, session handler 106 will terminate the session, in an embodiment.

Figure 3:
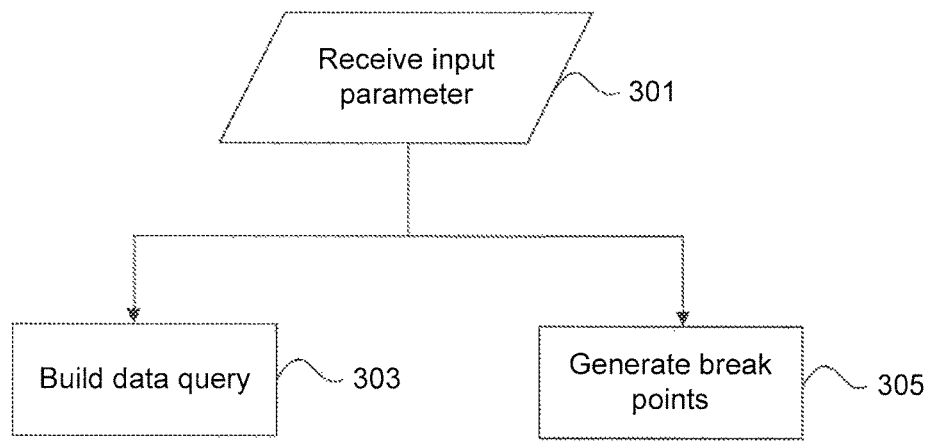
FIG. 3 is a flowchart illustrating a process for compiling a data query and generating break points, according to an example embodiment.

FIG. 3 is a flowchart for a method 300 for compiling a data query and generating break points, according to an embodiment. Method 300 can be performed by processing logic that can comprise hardware (e.g., circuitry, dedicated logic, programmable logic, microcode, etc.), software (e.g., instructions run on a processing device), or a combination thereof.

According to an embodiment, at step 301, query builder 103 receives an input parameter from GUI 104. At step 303 query builder 103 may compile a data query comprising a request to traverse a graph data set based upon the input parameter. The input parameter may comprise a graph data set pointer, a query type, a plurality of parameters, and at least one operator.

In an embodiment, the graph data set pointer comprises a value that refers to the location of a graph data set stored in graph data storage 110. The graph data pointer may be used to determine which graph data set stored in graph data storage 110 will be traversed. For example the graph data pointer may comprise a value that refers to the location of graph data set N stored on graph data storage 110.

The query type comprises a value that refers to how the data of a graph data set will be traversed, according to an embodiment. The query type may comprise a value of vertex iterator, edge iterator, breadth-first search (BFS) iterator, or depth-first search (DFS)—to name a few. Based upon the query type, the values of a graph data set may be traversed by traversing the values of the vertices of a graph data set, the values of the edges of a graph data set, by a BFS, or by a DFS, to name examples.

Based upon the graph data set pointer and the query type, query builder 103 will then compile a data query requesting a traversal of a graph data set in any database-readable language. For example, if the graph data set pointer refers to the location of graph data set N and the query type refers to a value of vertex iterator, then a data query comprising a request to traverse the values of the vertices of graph data set N will be compiled in a database-readable language.

In an embodiment, at step 305, a plurality of break points are generated based on the input parameter. The conditions of the break points are determined according the plurality of parameters and at least one operator of the input condition.

The plurality of parameters may comprise a data type and a data value, according to an embodiment. For example, if the graph data set to be traversed comprised data relating to the ages of a workers, the plurality of parameters may comprise age and 21 wherein age would be the data type and 21 would be the data value. The at least one operator determines the relationship between the type of graph data and the data value. The at least one operator may comprise ==, <, <=, >, >=, =/=, or Boolean operators—to name a few.

For example, if the input condition comprises a data type of age, a data value of 21, and an operator of ==, then a plurality of breaks points will be generated comprising conditions of age ==21 (age is equal to 21).

In an embodiment, the plurality of parameters may comprise a data type and a data range. For example, if the graph data set to be traversed comprised data relating to the ages of a workers, the plurality of parameters may comprise age and 21-25 wherein age would be the data type and 21-25 would be the data range. The at least one operator determines the relationship between the type of graph data and the data range. The at least one operator may comprise ==, <, <=, >, >=, =/=, or Boolean operators—to name a few.

According to an embodiment, the plurality of parameters may comprise a data type and a data expression. The data expression may be in any database-readable language. The expression may, for example, comprise an expression in any database-readable language that, when evaluated, yields a data range or data value.

Figure 4:
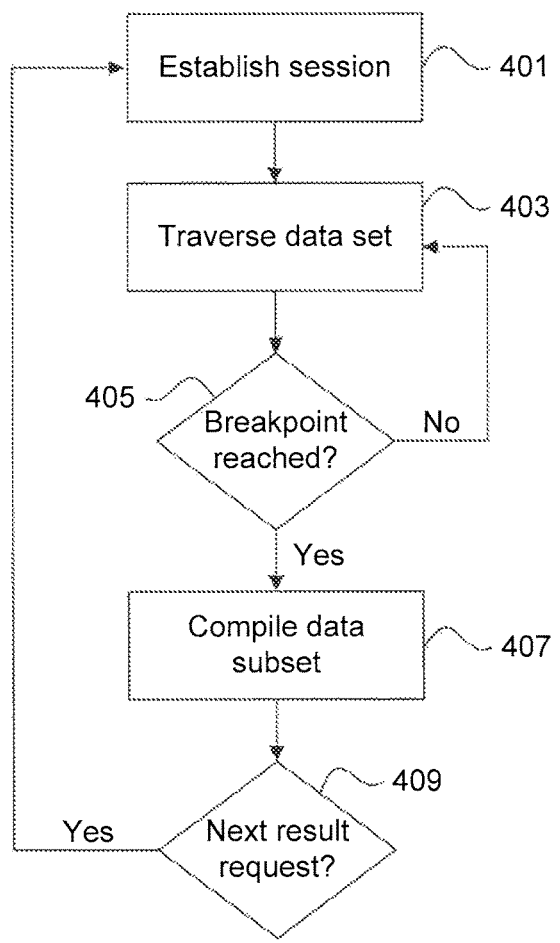
FIG. 4 is a flowchart illustrating a process for traversing a graph data set according to a plurality of break points, according to an example embodiment.

FIG. 4 is a flowchart for a method 400 for traversing a graph data set according to a plurality of break points, according to an embodiment. Method 400 can be performed by processing logic that can comprise hardware (e.g., circuitry, dedicated logic, programmable logic, microcode, etc.), software (e.g., instructions run on a processing device), or a combination thereof.

In an embodiment, prior to step 401, session handler 106 receives a data query and a plurality of break points from the query builder 103. At step 401 session handler establishes a session and evaluates the data query.

According to an embodiment, at step 403 the session handler 106 may command query processor 107, graph operators 108, and graph API 109 to traverse a graph data set according to the data query. For example if a data query comprising a request to traverse the values of the vertices of graph data set N is received, then session handler 106 will command query processor 107, graph operators 108, and graph API 109 to traverse the values of the vertices of graph data set N.

At step 405 session handler 106 evaluates the values of the data traversed by query processor 107, graph operators 108, and graph API 109 to determine whether or not the conditions of a break point are matched, in an embodiment. If no break point condition has been matched then step 402 is repeated. However, if a breakpoint condition has been matched then session handler 106 will halt the traversal of the graph data set by query processor 107, graph operators 108, and graph API 109.

For example, if a data query comprising a request to traverse the values of the vertices of graph data set N (comprising the data relating to the ages of workers) is received along with a plurality of break points comprising the condition of age ==21, then query processor 107, graph operators 108, and graph API 109 will traverse the vertices of graph data set N until a value of a vertex comprises a value of age equal to 21 is traversed. When this vertex is traversed, session handler 106 will halt the query and query processor 107, graph operators 108, and graph API 109 will halt the traversal of graph data set N.

According to an embodiment, at step 407, session handler 106 will compile and materialize a graph data subset comprising the data of the graph data set that were traversed before the query was halted. For example, if the vertices of a graph data set N had been traversed until the query was halted when a vertex comprising the value age equal to 21 was traversed, then all the vertices, including the vertex comprising the value age equal to 21, that had been traversed before the query was halted would be materialized into a graph data subset.

In an embodiment, step 409 evaluates whether a second input parameter received comprises a next result request. If the second input parameter does comprise a next result request, then session handler 106 continues the query that was halted and steps 402-405 are repeated.

One advantage of this embodiment is that it allows for exploration of multiple data graph data subsets in one session. Halting and continuation of the query allow for exploration of multiple graph data subsets in one session. Another advantage of this embodiment is that it allows for only one graph data subset being displayed at a time. Displaying only a desired graph data subset places less strain on a system than displaying an entire graph data set.

Figure 5:
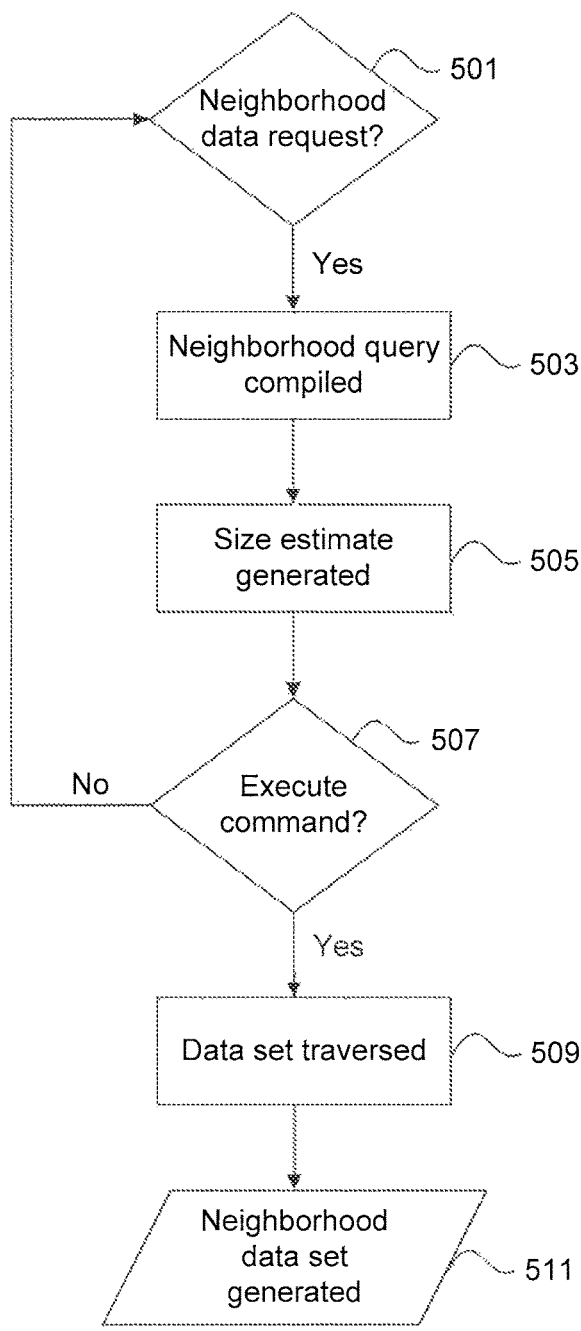
FIG. 5 is a flowchart illustrating a process for compiling a neighborhood query, according to an example embodiment.

FIG. 5 is a flowchart for a method 500 for compiling a neighborhood query. Method 500 can be performed by processing logic that can comprise hardware (e.g., circuitry, dedicated logic, programmable logic, microcode, etc.), software (e.g., instructions run on a processing device), or a combination thereof.

In an embodiment, prior to step 501, GUI 104 displays a materialized graph data subset and receives a second input parameter. The second input parameter may comprise a next result request, or a neighborhood data request, a graph bookmark request, or a query termination request. At step 501, GUI 104 evaluates the second input parameter to determine if it comprises a neighborhood data request.

The neighborhood data request comprises a request for data from a graph data set from which the graph data subset was partitioned, according to an embodiment. For example, if a graph data subset comprises data from graph data set N that was traversed before a data query was halted, then the neighborhood data request would comprise a request for data from graph data set N. The neighborhood request may comprise one of an incoming edges request, outgoing edges request, preceding vertices request, succeeding vertices request, specific edge attribute request, specific vertex attribute request and one of a selected edge or selected vertex—to name a few.

According to an embodiment, at step 503, the neighborhood data request is sent to query builder 103 and a neighborhood query is compiled comprising a request to traverse the data from a graph data set according to the neighborhood data request. For example the neighborhood data request may comprise an incoming edge request and a chosen vertex of a graph data subset. The graph data subset may comprise data from graph data set N that was traversed before a data query was halted. From this, a neighborhood query comprising a request to traverse the edges of graph data set N in descending order starting at the chosen vertex of the graph data subset may be compiled.

At step 505, the neighborhood query is sent to session handler 106, in an embodiment. According to an embodiment, the session handler 106 will compile a size estimate comprising an approximate size of the data requested by the neighborhood query. The size estimate may comprise a number of bits, a number of vertices, or a number of edges—to name a few. For example, the session handler 106 may receive a neighborhood query comprising a request to traverse the edges of graph data set N in descending order starting at the chosen vertex of the graph data subset. Session handler 106 may then estimate the size of the data to be traversed from the size of graph data set N, the size of the graph data subset, the number of vertices in graph data set N, or the number of edges of graph data set N—to name a few. The size estimate is then materialized and sent to GUI 104 where it is displayed to the user.

According to an embodiment, at step 507 GUI 104 may receive a third input parameter comprising an execute command after the size estimate is displayed. If a third input parameter comprising an execute command is received then session handler will initiate the neighborhood query.

At step 509, query processor 107, graph operators 108, and graph API 109 may traverse the data of a graph data set according to the neighborhood query, in an embodiment. For example, a neighborhood query may comprise a request to traverse the edges of graph data set N in descending order starting at the chosen vertex of the graph data subset. Query processor 107, graph operators 108, and graph API 109 may then traverse the edges of graph data set N in descending order starting at the chosen vertex of the graph data subset.

In an embodiment, at step 511, the neighborhood query is completed and the data that was traversed is compiled into a neighborhood data set and materialized. The neighborhood data set is then sent to GUI 104 where it is displayed.

Figure 6:
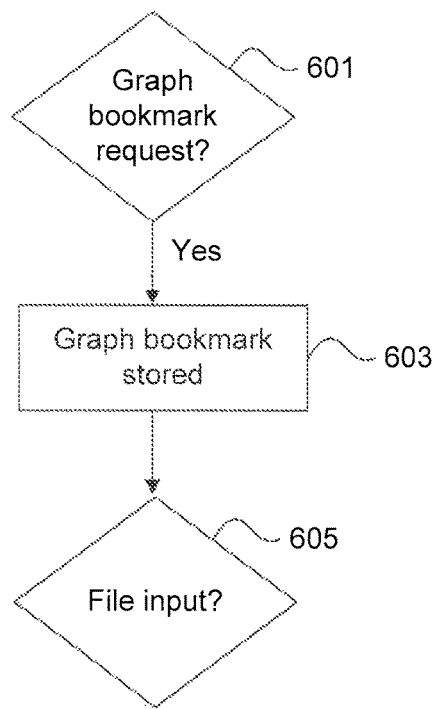
FIG. 6 is a flowchart illustrating a process for creating, storing, and recalling a graph bookmark, according to an embodiment.

FIG. 6 is a flowchart for a method 600 for creating, storing, and recalling a graph bookmark. Method 600 can be performed by processing logic that can comprise hardware (e.g., circuitry, dedicated logic, programmable logic, microcode, etc.), software (e.g., instructions run on a processing device), or a combination thereof.

According to an embodiment, prior to step 601, the GUI 104 displays a materialized graph data subset or materialized neighborhood data set. GUI 104 may then receive, for example, a second input parameter comprising a graph bookmark request, according to an embodiment.

In an embodiment, at step 601, the GUI 104 determines whether the second input parameter received comprises a graph bookmark request. If the second input parameter comprises a graph bookmark request, a graph bookmark is created comprising the data that a materialized graph data subset or neighborhood data set displayed in the GUI 104 comprises.

For example, GUI 104 may display a materialized graph data subset. GUI 104 may then receive a second input parameter comprising a graph bookmark request. GUI 104 may then create a graph bookmark comprising the data that the materialized graph data subset comprises.

According to an embodiment, the graph bookmark comprises a timestamp of creation, a set of materialized graph data, and a textual description comprising a text input received by the GUI 104.

At step 603, the graph bookmark is stored in the graph bookmark repository 105, in an embodiment. The graph bookmark repository may be a Random-Access Memory (RAM), a Flash Memory, a Hard Drive, a Solid State Drive-to name a few.

According to an embodiment, at step 605, GUI 104 may receive a file input. The file input may comprise, for example, a pointer comprising values relating to the location of a graph bookmark stored in the graph bookmark repository 105. If the GUI receives the file input, the data the graph bookmark corresponding to the pointer comprises is materialized and displayed in GUI 104. For example, GUI 104 may receive a file input comprising values relating to the location of graph bookmark A. GUI 104 may then materialize and display the data graph bookmark A comprises.

Figure 7:
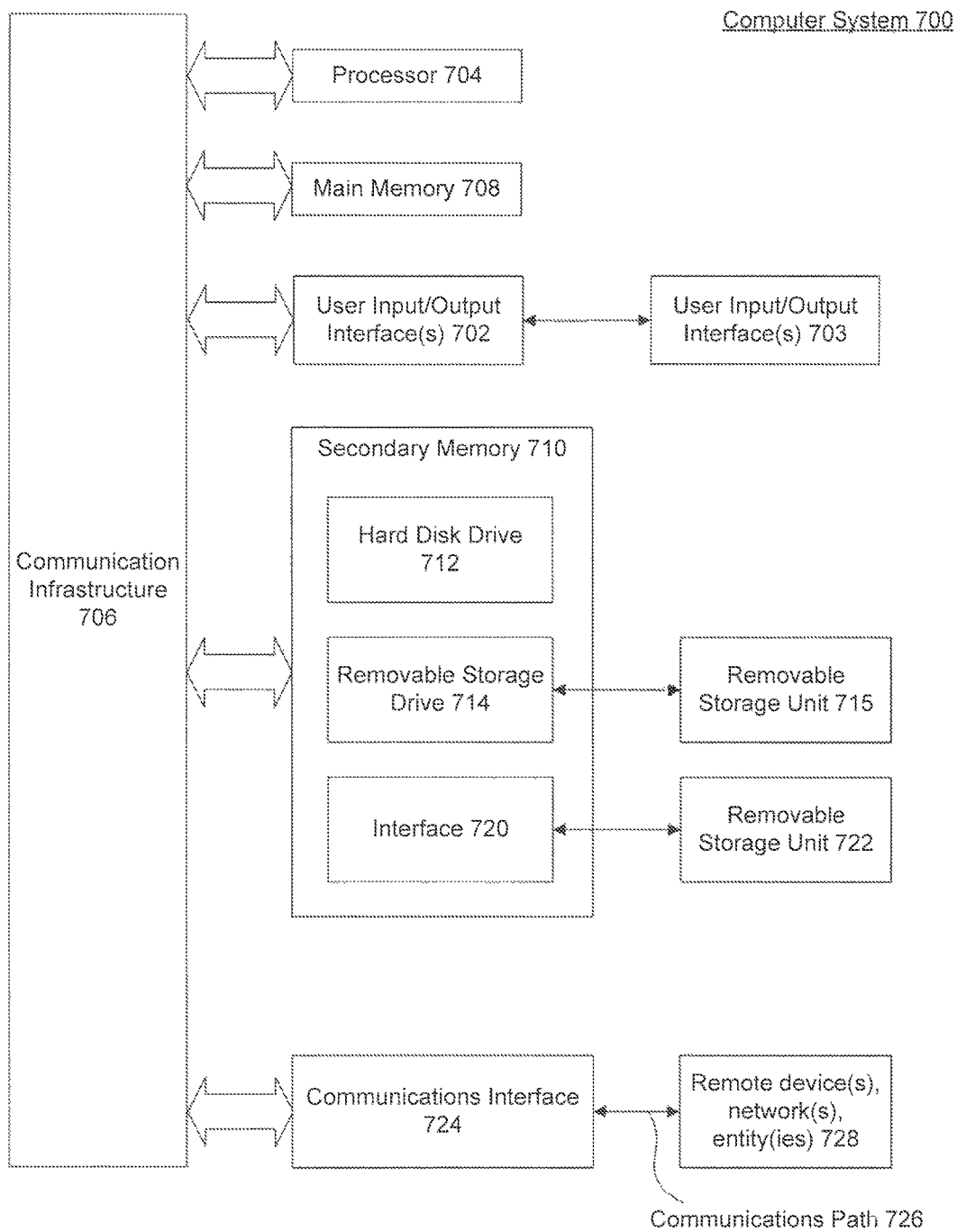
FIG. 7 is an example computer system useful for implementing various embodiments.

Various embodiments can be implemented, for example, using one or more well-known computer systems, such as computer system 700 shown in FIG. 7. Computer system 700 can be any well-known computer capable of performing the functions described herein.

Computer system 700 includes one or more processors (also called central processing units, or CPUs), such as a processor 704. Processor 704 is connected to a communication infrastructure or bus 706.

One or more processors 704 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 also includes user input/output device(s) 707, such as monitors, keyboards, pointing devices, etc., that communicate with communication infrastructure 706 through user input/output interface(s) 702.

Computer system 700 also includes a main or primary memory 708, such as random access memory (RAM). Main memory 708 may include one or more levels of cache. Main memory 708 has stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 includes a computer usable or readable storage device having stored thereon computer software (control logic) and/or data. Removable storage unit 718 may be a floppy disk, magnetic tape, compact disk, DVD, optical storage disk, and any other computer data storage device. Removable storage drive 714 reads from and/or writes to removable storage unit 718 in a well-known manner.

According to an exemplary embodiment, secondary memory 710 may include other means, instrumentalities or other approaches for allowing computer programs and/or other instructions and/or data to be accessed by computer system 700. Such means, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 enables computer system 700 to communicate and interact with any combination of remote devices, remote networks, remote entities, etc. (individually and collectively referenced by reference number 728). For example, communication interface 724 may allow computer system 700 to communicate with remote devices 728 over communications path 726, which may be wired and/or wireless, and which may include any combination of LANs, WANs, the Internet, etc. Control logic and/or data may be transmitted to and from computer system 700 via communication path 726.

In an embodiment, a non-transitory apparatus or article of manufacture comprising a non-transitory computer usable or readable medium having control logic (software) stored thereon is also referred to herein as a computer program product or program storage device. This includes, but is not limited to, computer system 700, main memory 708, secondary memory 710, and removable storage units 718 and 722, as well as non-transient articles of manufacture embodying any combination of the foregoing. Such control logic, when executed by one or more data processing devices (such as computer system 700), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 7. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A computer implemented method, comprising:
    initiating a session during which a graph data set is traversed based on a query;
    evaluating traversed data of the graph data set against a breakpoint, wherein the breakpoint was received prior to the initiating;
    detecting, based on the evaluating, that a record of the data set satisfies a condition of the breakpoint, wherein the breakpoint condition is different from the query;
    halting the traversal of the graph data set during the session based on the detecting and prior to evaluating all of the data of the graph data set at a halted data value, wherein the graph data set comprises a set of vertices and edges in a column-based format stored in a memory cache;
    compiling and materializing data that was traversed prior to the detecting the breakpoint that satisfies the query;
    providing a display of a portion of the graph data set based upon the compiled and materialized data traversed prior to the detecting;
    receiving a next result request responsive to the providing;
    continuing the traversal of the graph data set from the halted data value during the session based on the next result request until a next breakpoint condition is reached;
    compiling and materializing a subsequent portion of the data of the graph data set that was traversed during the continuing from the halted data value; and
    updating the display to include both the compiled and materialized subsequent portion of the data of the graph data set that was traversed during the continuing and at least a portion of the graph data set that was displayed prior to detecting the halted data value;
    wherein the compiling, halting, and providing are performed by one or more computers.

2. The method of claim 1 further comprising:
    displaying at least one of a neighborhood data set based upon a second input parameter, wherein the neighborhood data set comprises data from the graph data.

3. The method of claim 2, wherein the neighborhood data set further comprises:
    a plurality of incoming and outgoing edges based upon the second input parameter;
    a plurality of preceding and succeeding vertices based upon the second input parameter; and
    a plurality of vertex and edge attributes based upon the second input parameter.

4. The method of claim 1, further comprising:
    receiving an input parameter from a graphical user interface associated with the query comprises the breakpoint, and wherein the input parameter comprises at least one operator and a plurality of conditions.

5. The method of claim 1 further comprising:
    performing a traversal of the graph data set based upon the query;
    halting the traversal of the graph data set based upon a first detection of the breakpoint; and partitioning the graph data set into a plurality of graph data subsets based upon the halted traversal of the graph data set.

6. A system, comprising:
   a memory configured to:
      store a graph data set; and
   at least one processor coupled to the memory and configured to:
      initiate a session during which the graph data set is traversed based on a query;
      evaluate traversed data of the graph data set against a breakpoint, wherein the breakpoint was received prior to the initiating;
      detect, based on the evaluating, that a record of the data set satisfies a condition of the breakpoint, wherein the breakpoint condition is different from the query;
      halt the traversal of the graph data set during the session based on the detecting and prior to evaluating all of the data of the graph data set at a halted data value, wherein the graph data set comprises a set of vertices and edges in a column-based format stored in a memory cache;
      compile and materialize data that was traversed prior to the detecting the breakpoint that satisfies the query;
      provide a display of a portion of the graph data set based upon the compiled and materialized data traversed prior to the detecting;
      receive a next result request responsive to the providing;
      continue the traversal of the graph data set from the halted data value during the session based on the next result request until a next breakpoint condition is reached;
      compile and materialize a subsequent portion of the data of the graph data set that was traversed during the continuing from the halted data value; and
      update the display to include both the compiled and materialized subsequent portion of the data of the graph data set that was traversed during the continuing and at least a portion of the graph data set that was displayed prior to detecting the halted data value.

7. The system of claim 6, wherein the at least one processor is further configured to:
   transmit a second display signal comprising at least one of a neighborhood data set based upon a second input parameter, wherein the neighborhood data set comprises data from the graph data set from which a first graph data subset was partitioned.

8. The system of claim 6, wherein the at least one processor is further configured to:
   receive an input parameter from a graphical user interface associated with the query comprises the breakpoint, and wherein the input parameter comprises at least one operator and a plurality of conditions.

9. The system of claim 6, wherein the at least one processor is further configured to:
   perform a traversal of the graph data set based upon the query;
   halt the traversal of the graph data set based on a first detection of the breakpoint; and
   partition the graph data set into a plurality of graph data subsets based upon the halted traversal of the graph data set.

10. The system of claim 6, wherein the memory further is configured to:
   store at least one of a neighborhood data set or a graph data subset based upon a second input parameter.

11. A non-transitory computer-readable device having instructions stored thereon that, when executed by at least one computing device, causes the at least one computing device to perform operations comprising:
   initiating a session during which a graph data set is traversed based on a query;
   evaluating traversed data of the graph data set against a breakpoint, wherein the breakpoint was received prior to the initiating;
   detecting, based on the evaluating, that a record of the data set satisfies a condition of the breakpoint, wherein the breakpoint condition is different from the query;
   halting the traversal of the graph data set during the session based on the detecting and prior to evaluating all of the data of the graph data set at a halted data value, wherein the graph data set comprises a set of vertices and edges in a column-based format stored in a memory cache;
   compiling and materializing data that was traversed prior to the detecting the breakpoint that satisfies the query;
   providing a display of a portion of the graph data set based upon the compiled and materialized data traversed prior to the detecting;
   receiving a next result request responsive to the providing;
   continuing the traversal of the graph data set from the halted data value during the session based on the next result request until a next breakpoint condition is reached;
   compiling and materializing a subsequent portion of the data of the graph data set that was traversed during the continuing from the halted data value; and
   updating the display to include both the compiled and materialized subsequent portion of the data of the graph data set that was traversed during the continuing and at least a portion of the graph data set that was displayed prior to detecting the halted data value.

12. The computer-readable device of claim 11, further comprising:
   transmitting a second display signal comprising at least one of a neighborhood data set based upon a second input parameter, wherein the neighborhood data set comprises data from the graph data set.

13. The computer-readable device of claim 12, wherein the neighborhood data set further comprises:
   a plurality of incoming and outgoing edges based upon the second input parameter;
   a plurality of preceding and succeeding vertices based upon the second input parameter; and
   a plurality of vertex and edge attributes based upon the second input parameter.

14. The computer-readable device of claim 11, further comprising:
   receiving an input parameter from a graphical user interface associated with the query comprises the breakpoint, wherein the input parameter comprises at least one operator and a plurality of conditions.

15. The computer-readable device of claim 11, the operations further comprising:
   performing a traversal of the graph data set based upon the query;
   halting the traversal of the graph data set based upon a first detection of the breakpoint; and partitioning the graph data set into a plurality of graph data subsets based upon the halted traversal of the graph data set.

16. The method claim 1, wherein the evaluating comprises:
determining that the breakpoint comprises a condition against which values of the data set are evaluated, wherein the graph data set comprises a plurality of the breakpoints.

17. The method claim 1, further comprising:
receiving, after the next breakpoint, an interaction associated with the display, wherein the interaction comprises a request to stop processing the query; and
terminating the query based on the interaction.

18. The method claim 1, wherein the compiling comprises:
determining that a first plurality of records of the data, traversed prior to the detecting the breakpoint, satisfy the query; and
wherein the continuing comprises determining that a second plurality of records of the data traversed after detecting the breakpoint and prior to the next breakpoint is reached.

19. The method claim 1, wherein the next breakpoint comprises an end of the dataset.

20. The device of claim 11, wherein the operations further comprise:
receiving, after the continuing, an interaction associated with the display, wherein the interaction comprises a request to stop processing the query; and
terminating the query based on the interaction.

* * * * *